(12) United States Patent
Kikugawa (10) Patent No.: US 8,085,633 B2
(45) Date of Patent: Dec. 27, 2011

(54) OPTICAL DISC DRIVE

(75) Inventor: Atsushi Kikugawa, Tokyo (JP)

(73) Assignees: Hitachi Consumer Electronics Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 12/715,846

(22) Filed: Mar. 2, 2010

(65) Prior Publication Data

US 2011/0080822 A1    Apr. 7, 2011

(30) Foreign Application Priority Data

Oct. 2, 2009  (JP) .................................. 2009-230156

(51) Int. Cl.
*G11B 7/00*    (2006.01)
(52) U.S. Cl. .................. 369/47.28; 369/47.35; 369/59.2
(58) Field of Classification Search .................. None
See application file for complete search history.

(56) References Cited

U.S. PATENT DOCUMENTS

| | | |
|---|---|---|
| 2007/0053262 A1 | 3/2007 | Kikugawa et al. |
| 2008/0219132 A1 | 9/2008 | Kikugawa |
| 2009/0196156 A1 | 8/2009 | Kikugawa |
| 2010/0027390 A1 | 2/2010 | Kikugawa |

FOREIGN PATENT DOCUMENTS

| | | | |
|---|---|---|---|
| JP | 2007-73147 A | | 3/2007 |
| JP | 2007073147 | * | 3/2007 |

OTHER PUBLICATIONS

U.S. Appl. No. 12/572,354.
A. Arimoto et al., Noise Reduction of Diode Laser Video Disc Players with High Frequency Current Superposition, Optics, vol. 14, No. 5, pp. 377-384, Oct. 1985.
A. Kikukawa et al., Novel HF-pulse read signal converter for increasing read signal SNR, Digest of International Symposium on Optical Memory 2007, pp. 302-303.
F.M. Gardner, Interpolation in Digital Modems—Part I: Fundamentals, IEEE Transactions on Communications, vol. 41, No. 3, pp. 501-507, Mar. 1993.
K. Mishima et al., 150 GB, 6-Layer Write Once Disc for Blu-ray System, presented at Optical Data Storage Top. Meet., 2006, TuA3.
L. Erup et al., Interpolation in Digital Modems—Part II: Implementation and Performance, IEEE Transactions on Communications, vol. 41, No. 6, pp. 998-1008, Jun. 1993.
F. Op't Eynde et al., Analog Interfaces for Digital Signal Processing Systems, Kluwer Academic Publishers, Boston/Dordrecht/London, pp. 91-92, 1993.

* cited by examiner

*Primary Examiner* — Jorge L Ortiz Criado
(74) *Attorney, Agent, or Firm* — Mattingly & Malur, P.C.

(57) ABSTRACT

When a multilayered optical disc is used, the signal-to-noise ratio of a read signal is decreased as effective reflectance is extremely low due to the influence of reflection and absorption by front recording layers. Further, when a high-frequency modulation technology is used to suppress returned light noise of a laser, the erasure of recorded information is likely to occur on certain types of discs, making it difficult to simultaneously achieve the suppression of returned light noise of a laser and the prevention of the erasure of recorded information. To address the above problems, the present invention includes a section that performs a read by executing a multi-tone demodulation. The present invention also includes a section that controls the position and shape of a read light pulse to be radiated on a recording layer.

8 Claims, 9 Drawing Sheets

PRIOR ART

FIG. 3

PRIOR ART

FIG. 4

PRIOR ART

OPTICAL DISC DRIVE

CLAIM OF PRIORITY

The present application claims priority from Japanese Patent Application JP 2009-230156 filed on Oct. 2, 2009, the content of which is hereby incorporated by reference into this application.

BACKGROUND OF THE INVENTION (1) Field of the Invention

The present invention relates to a read technology for an optical disc drive, and more particularly, to a highly read light resistive optical disc drive.

(2) Description of the Related Art

Although the scope of the present invention is not limited to Blu-ray Discs (BDs), the following description assumes that the present invention is applied to BDs. Further, technical terms used with BDs are basically used.

Many of BD devices and other optical disc devices use a high-frequency modulation technology in order to suppress noise that is generated by a laser diode, which is used as their light source. This technology is disclosed in "Optics," Vol. 14, No. 5, pp. 377-383, and well known to persons skilled in the art. Therefore, the following description furnishes only essential information about this technology without giving further details.

When laser light reflected from a disc is incident on an oscillating laser diode, the oscillation state becomes unstable so that significant laser noise is generated. The high-frequency modulation technology is used to avoid the generation of such laser noise. The high-frequency modulation technology is exercised so that a high-frequency signal is superimposed on a laser diode drive signal to generate a pulsed laser beam. The resulting light emission waveform looks like a periodic pulse shown in FIG. 2. Here, the ratio (duty) between a laser pulse interval (modulation period) and a light emission period and the peak power of pulses or the average power of a laser pulse train are used as main parameters. The laser pulse interval and pulse duty are determined on the assumption that a laser pulse reflected from a disc does not fall upon the laser diode during laser oscillation.

Figure 3:
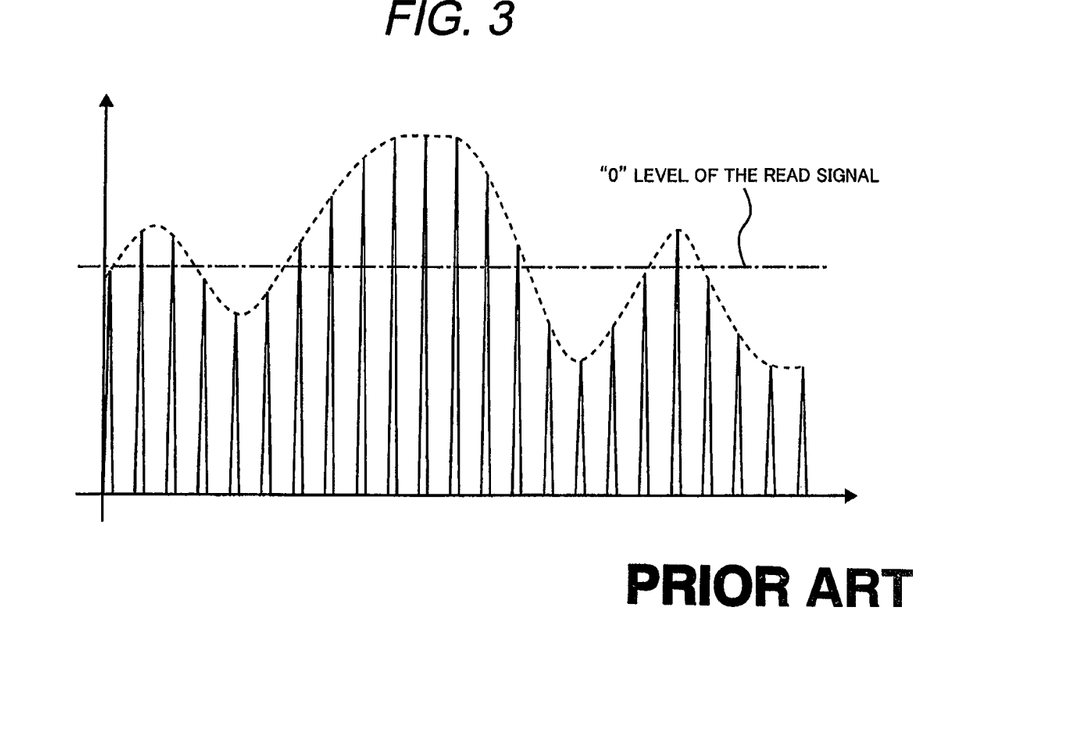
FIG. 3 is a diagram illustrating a pulsed read signal.

In a recording layer of an optical disc, information is recorded with marks and spaces. The marks and spaces used for a recordable optical disc differ in reflectance. Therefore, when pulsed laser light is focused on a recording film of the optical disc, the amplitude of a laser pulse is modulated because the intensity of reflected laser light varies depending on whether the laser light is incident on a mark or a space. If, for instance, no bandwidth limitation is imposed by a read photodiode and a current-to-voltage conversion amplifier, the resulting read signal waveform is as shown in FIG. 3. A signal made of a read pulse train indicated in FIG. 3 is hereinafter referred to as a pulsed read signal. The broken line in FIG. 3 indicates a read signal waveform that is obtained when, for instance, a laser continuously oscillates at the same output level as for a peak laser pulse generated during high-frequency modulation. In other words, the upper envelope of the pulsed read signal is shaped like a read signal waveform derived from continuous light. Therefore, a desired read waveform can be obtained by envelope detection that is, allowing the pulsed read signal to pass through a low-pass filter having a cut-off frequency sufficiently lower than the frequency of, the frequency of a high-frequency current to be superimposed. In existing optical disc devices, the above functionality is implemented as bandwidth limitation is imposed by an analog equalizer and a system having a photodetector and current-to-voltage conversion amplifier.

Pulsing a read signal is one type of amplitude modulation. Thus, a line-like spectrum of a superimposed high-frequency signal and a modulated read signal component, which is positioned near the line-like spectrum, are visible. In this specification, therefore, the superimposed high-frequency signal is hereinafter simply referred to as the carrier. A typical standard carrier frequency for BDs is approximately 400 MHz. The carrier frequency is determined exclusively by the optical path length of a read optical system. It is therefore understood that the carrier frequency does not significantly vary from one BD device to another.

Figure 4:
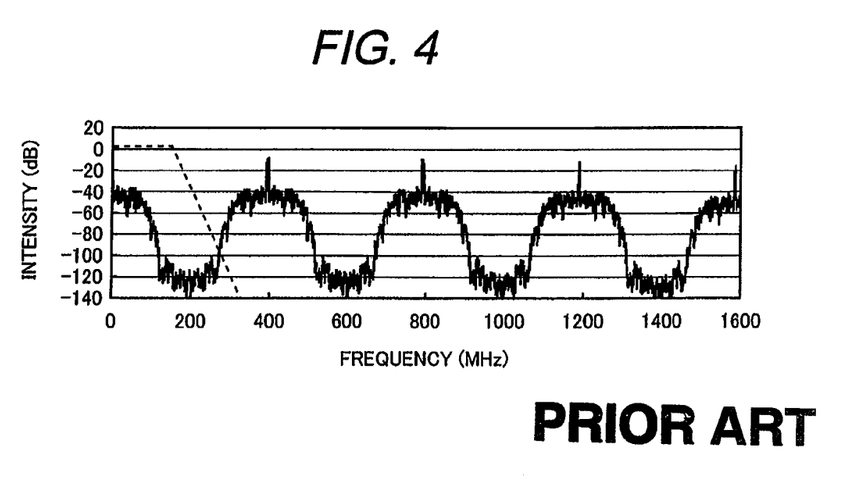
FIG. 4 shows the spectrum of a pulsed read signal.

FIG. 4 shows a typical spectrum of a pulsed read signal. The broken line in FIG. 4 schematically shows the bandwidth limitation imposed by an analog equalizer and a system having a photodetector and current-to-voltage conversion amplifier. When the above-mentioned conventional method is used to convert a pulsed read signal to a continuous signal, it means that the entire harmonic component is attenuated (suppressed). Therefore, the obtained read signal amplitude is reduced so that the ratio between the resulting amplitude and the amplitude of the pulsed read signal is substantially equal to a pulse duty.

A multi-tone demodulation (MTD) technology is available as a technology that provides improvement when the SNR (signal-to-noise ratio) is reduced by a decrease in the resulting amplitude as mentioned above. This technology is not only disclosed in detail in Japanese Patent Application Laid-Open Publication No. 2007-73147 (corresponding to US-A No. 2007/0053262), but also is described in "Novel HF-pulse read signal converter for increasing read signal SNR," by Atsushi Kikukawa and Hiroyuki Minemura, Digest of International Symposium on Optical Memory 2007, pp. 302-303. The MTD technology not only improves the SNR of a read signal, but also addresses a problem in which the separation between a read signal and a carrier is difficult during a high-speed read as detailed in Japanese Patent Application Laid-Open Publication No. 2007-73147 (corresponding to US-A No. 2007/0053262). In other words, signals derived from MTD do not, in principle, contain a carrier's line-like spectrum.

It is well known to persons skilled in the art that an optical disc read signal process is mainly performed by a digital method such as a PRML (partial response most-likely) method. When a digital signal processing system is used, it is common that a PLL (phase-locked loop) circuit for synchronizing a read signal clock with a signal processing circuit clock is also digitized. In reality, however, the digitized PLL circuit includes analog components such as a voltage-controlled oscillator and a DAC (digital-to-analog converter). A problem with the use of an analog component is that its characteristics readily vary from one unit to another. In view of such circumstances, a signal processing system having no analog components has been studied in recent years as described in "Interpolation in Digital Modems—Part I: Fundamentals," by Floyd M. Gardner, IEEE Transactions on Communications, Vol. 41, pp. 501-507 (1993).

Now that BDs are commercialized, an attempt is being made to further increase the capacity of an optical disc. As described in a paper authored by K. Mishima, D. Yoshitoku, H. Itoh, S. Yamatsu, H. Inoue, T. Komaki, K. Tanaka, and T. Aoi and presented at Optical Data Storage Top. Meet., 2006, TuA3, one promising method is to use an optical disc having multiple recording layers. When an optical disc having multiple recording layers is used, the amount of light reflected from the rearmost recording layer is extremely smaller than when a conventional optical disc is used because the light is reflected and absorbed by recording layers in front of it. If the ratio of the amount of reflected light to the amount of incident light is defined as the apparent reflectance, the apparent reflectance of a multilayered optical disc is lower than that of a double-layered BD or the like. This will lower the SNR (signal-to-noise ratio) of a read signal. Further, as the transmittance of each front recording layer needs to be sufficiently high, the absorptance needs to be low. It is therefore necessary that recordable discs be made of a recording layer material having a higher recording sensitivity than before. However, particularly in the case of a rewritable disc, an increase in the recording sensitivity will increase the likelihood of causing read light to erase recorded marks. In this specification, the expression "read light resistive" is used to indicate that read light is not likely to erase recorded marks.

SUMMARY OF THE INVENTION

As described under "Description of the Related Art," a multilayered optical disc has multiple recording layers. Therefore, light is reflected and absorbed by front recording layers so that the amount of light reflected from the rearmost recording layer is extremely smaller than when a double-layer BD is used. This causes a problem where the SNR (signal-to-noise ratio) of a read signal is lowered.

The transmittance of each front recording layer needs to be sufficiently high. Thus, the absorptance of each front recording layer needs to be low. It is therefore necessary that recordable discs be made of a recording layer material having a higher recording sensitivity than before. However, particularly in the case of a rewritable disc, an increase in the recording sensitivity will increase the likelihood of causing read light to erase recorded marks. Consequently, this causes another problem where read performance deterioration caused by a lowered SNR of a read signal cannot be readily compensated for by increasing the intensity of read light.

As described under "Description of the Related Art," the use of the high-frequency modulation technology is effective in suppressing returned light noise of a laser. However, when the high-frequency modulation technology is used, laser light is pulsed so that the power level prevailing at the peak of a read light pulse is several times higher than that of average power of read light. Recorded information is erased by read light when the read light raises the temperature of a recording film. Under conditions where the average power of read light remains unchanged, the erasure of recorded information is likely to occur when the peak power of a pulse is high, that is, when the pulse duty is small, and is most unlikely to occur when no high-frequency modulation is performed. It means that it is difficult to simultaneously achieve the suppression of returned light noise of a laser and the prevention of the erasure of recorded information.

As is obvious from the above description, it is difficult to simultaneously maintain read performance and read light resistivity particularly when a multilayered rewritable disc is used.

The present invention has been made in view of the above circumstances, and provides a device that prevents recorded information from being erased by read light during high-frequency modulation and controls the position and shape of a read light pulse to be radiated on a recording layer.

The device for preventing recorded information from being erased by read light during high-frequency modulation will now be described. Recorded information erasure by a read light pulse does not take place when a pulse radiation occurs several times under normal read conditions. It becomes evident when a read operation is performed several tens of thousand to approximately a million times. Under conditions where radiated pulses have the same peak power, therefore, decreasing the frequency of pulse radiation onto a specific recorded mark makes it possible to improve the read light resistivity accordingly. Decreasing the pulse duty decreases the cumulative amount of optical power radiated on the same spot. In this instance, the average power decreases. Therefore, when a common read method is used, the amplitude of a read signal decreases to lower the SNR. As such being the case, an MTD read method is employed to compensate for the decrease in the SNR of a read signal. In other words, when the MTD read method is used with an appropriate pulse duty selected, the read light resistivity can be improved while preventing the read performance from being degraded.

Figure 5:
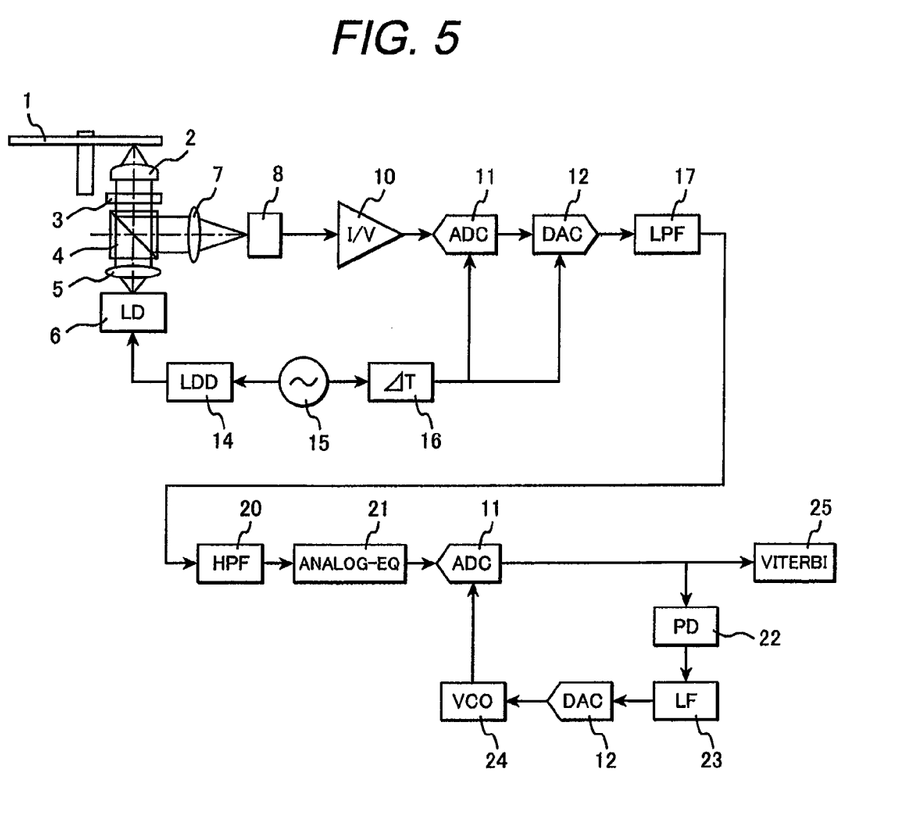
FIG. 5 shows a typical configuration of a conventional optical disc drive.

The operation and effect of MTD will now be described. FIG. 5 shows a typical configuration of a device that performs MTD. This figure excludes portions that are not essential to the subsequent description. The configuration shown in FIG. 5 is characterized in that a pulsed read signal is converted to a continuous read signal by using a set of an ADC (analog-to-digital converter) 11 and a DAC (digital-to-analog converter) 12.

Figure 2:
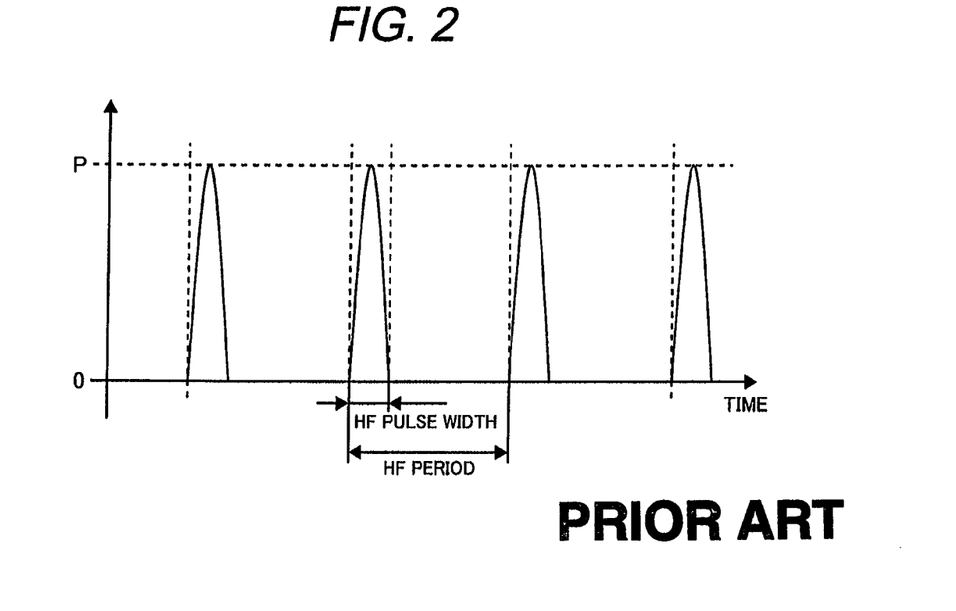
FIG. 2 is a diagram illustrating the high-frequency modulation light emission of a laser.

A carrier is generated by an oscillator 15 and input into a laser driver 14. The laser driver 14 generates a laser drive current so that desired average laser power, peak power, and duty are obtained, and inputs the generated laser drive current into a laser diode 6. The laser driver 14 also controls the laser drive current so that the average laser output is constant. The output light intensity of the laser diode changes with time as shown in FIG. 2.

Laser light is converted to a parallel beam by a collimator lens 5. After passing through a polarizing beam splitter 4 and a quarter-wavelength plate 3, the parallel beam is focused on the surface of a recording film of a disc 1 by an objective lens 2. The laser light is reflected from the recording film surface so that a reflected pulsed laser train on which an intensity variation based on recorded marks and spaces are superimposed is obtained. Temporal changes in the resultant laser light intensity match with those in the pulsed read signal shown in FIG. 3. When the reflected pulsed laser train returns to the polarizing beam splitter 4 through the currently used path, it is reflected, focused on a photodiode 8 by a converging lens 7, and converted to an electrical current. The electrical current is converted to a voltage signal by a current amplifier 10. The voltage signal is then converted to a digital signal by the ADC 11. The output of the ADC 11 is input into the DAC 12.

Figure 6:
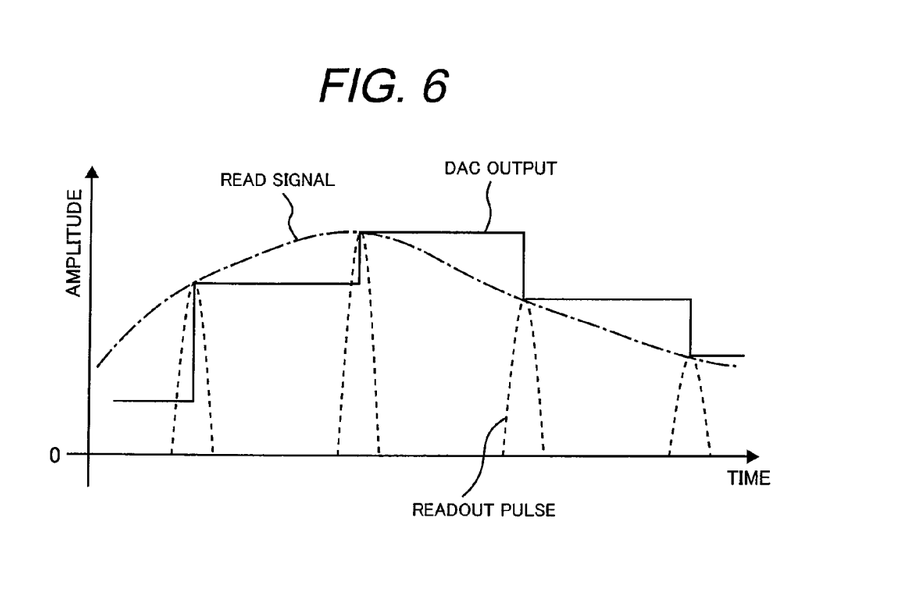
FIG. 6 shows how an ADC converts a pulsed read signal to a continuous signal.

The ADC needs to be driven so as to sample the peak value of each pulse within the pulsed read signal (indicated by the broken line) as shown in FIG. 6. Thus, an HF oscillator output is used as a drive clock for the ADC and DAC. However, there is a phase difference between the HF signal and pulsed read signal due to delay (latency) caused by the photodiode and a process performed before laser light emission. Therefore, the phase difference is adjusted by a variable delay line 16. As mentioned under "Description of the Related Art," FIG. 3 shows a case where no bandwidth limitation is imposed by the read photodiode and current-to-voltage conversion amplifier. However, if bandwidth limitation is imposed by them, a signal substantially equal to the signal shown in FIG. 3 can be obtained as far as an adequate band is available although the spread and peak value of each pulse decreases depending on the degree of bandwidth limitation.

The DAC retains the value of a sampled pulse peak for one clock cycle. Therefore, the DAC generates a step-like output as indicated by the solid line in FIG. 6. For the sake of simplicity, it is assumed that the ADC and DAC perform ideal operations. Further, as one clock cycle is required for the transmission of the output of the ADC to the DAC, the step-like output of the DAC is actually delayed behind the pulsed read signal by one clock cycle. In FIG. 6, however, such a delay is ignored to indicate individual waveforms in such a manner as to clarify the mutual relationship between the waveforms. The step-like waveform is a read signal that contains a distortion component. The distortion component is eliminated by a low-pass filter 17.

The output of the low-pass filter 17 is equivalent to a read signal output from a pickup in a conventional manner except that its amplitude and SNR are improved. For subsequent decoding, therefore, the same procedure as for a conventional optical disc drive may be used. More specifically, a high-pass filter 20 eliminates a dc component from the output of the low-pass filter 17. The output of the high-pass filter 20 is then equalized by an analog equalizer 21, and converted to a digital signal by the ADC. The resultant digital read signal is then subjected to clock synchronization in a PLL. The output of the PLL is decoded by a Viterbi decoder 25. The PLL includes an ADC, a phase detector 22, a loop filter 23, a DAC, and a voltage-controlled oscillator 24. The operation of the PLL will not be described in detail here because it is widely known.

The signal processing system, which is configured as described above, includes analog components such as the high-pass filter, analog equalizer, ADC, DAC, and voltage-controlled oscillator. The problem with such analog components is that their characteristics significantly vary from one unit to another. To avoid the influence of differences in the characteristics of individual units, it is often necessary to incorporate an additional function into an optical disc drive such as an adjustment function.

In optical disc drives, the ADC and subsequent circuits of the PLL are generally integrated into a system LSI together with an error correction circuit and various controllers. The system LSI is usually mounted on a main board. It is therefore necessary that an analog read signal be transmitted from the pickup to the main board. If the analog read signal includes an extraneous noise or a crosstalk component from a signal in a neighboring signal line, the quality of the read signal deteriorates to increase the error rate. Further, during a high-speed read during which the read signal band is enlarged, even a high-frequency component needs to be transmitted without being phase-distorted. It is likely that a transmission line meeting all the above requirements will be expensive and difficult to design and implement.

In the configuration example shown in FIG. 5, a pulsed read signal is converted to a digital signal and then converted back to an analog signal. This feature makes it possible to enter a signal into a conventional synchronous signal processing circuit.

Figure 7:
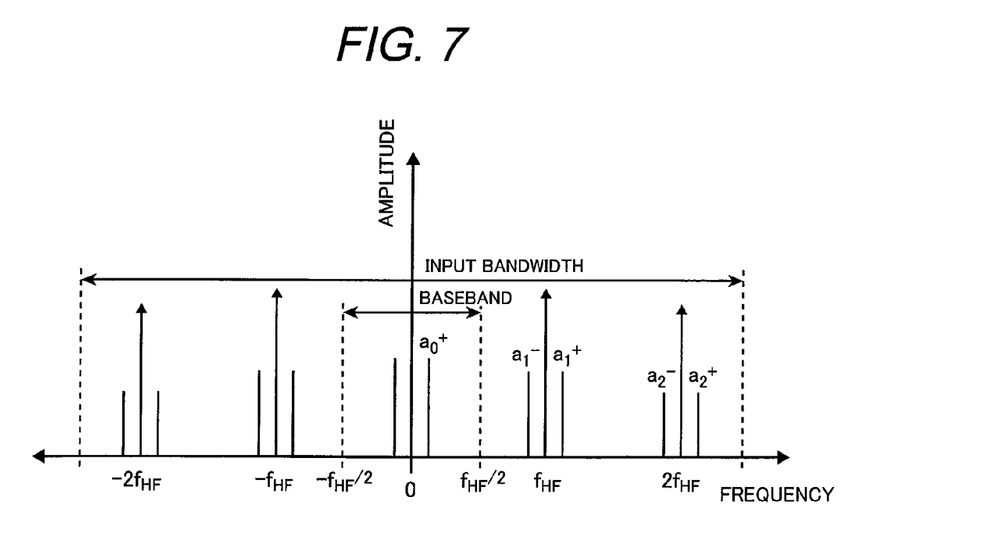
FIG. 7 is a schematic diagram illustrating the operating principle of MTD.

The operating principle of MTD will now be described. For the sake of simplicity, it is assumed that a sine wave having a frequency of f is used as a read signal. FIG. 7 is a schematic diagram illustrating a spectrum that is obtained when a sine wave is pulse-modulated at a frequency of $f_{HF}$. As the read signal is assumed to be a sine wave, the spectrum of the read signal and its harmonic is a line-like spectrum.

In this specification, it is assumed that the order of a signal harmonic agrees with the order of a modulation frequency. More specifically, the modulation frequency itself is of the first order. A direct current is formally considered to be of the zero order. A harmonic on the negative frequency side is considered to be of a minus order. More specifically, a negative modulation frequency itself is considered to be of the minus first order. The amplitude of a signal harmonic in the upper or lower sideband of a harmonic of each modulation frequency is designated in a signed form such as a (i, +) or a (i, −). Further, a band having a width of $f_{HF}$ around the harmonic of a modulation frequency is referred to as the harmonic band.

When the above-mentioned pulse-modulated sine wave is sampled at a modulation frequency as shown in FIG. 6, the harmonic component except for a baseband component is entirely under-sampled because it has a frequency of $f_{HF}/2$ or higher. As is well known, in the event of under-sampling, the sampled signal is subjected to frequency conversion by the frequency difference between the two. More specifically, signals within a band having a width of $f_{HF}$ around a frequency $\pm f_{HF}$ in FIG. 7 are frequency-converted to baseband signals, respectively. Further, it will be readily understood by those skilled in the art that signals within higher harmonic bands are also frequency-converted to baseband signals. In other words, when MTD is performed, all harmonic signal components within an input band are converted to those within a baseband. It will be readily understood by those skilled in the art that the converted signals are equal not only in frequency but also in phase. As a result of MTD, therefore, individual signal harmonics are added in synchronism with a read signal component (zero-order signal harmonic) within the baseband. Thus, the amplitude of a signal component A in the output of MTD can be expressed by Equation 1 below:

$$A = \left| \sum_{i=0}^{M} a(i, +) \right| + \left| \sum_{i=0}^{M} a(i, -) \right| \quad \text{Equation 1}$$

Meanwhile, a noise component in a harmonic band is also frequency-converted to a component within the baseband by MTD, and becomes a part of the output noise of MTD. However, noise components in individual harmonic bands are uncorrelated to each other. Therefore, the noise components that are frequency-converted from those within the individual harmonic bands to those within the baseband are asynchronously added. Consequently, the resulting amplitude is equal to the square root of the squared sum of all components. If it is assumed here that the noise spectrum is flat within the input band and has an average amplitude of n, the output noise of MTD can be expressed as follows:

$$N = \sqrt{2M} n \quad \text{Equation 2}$$

Figure 8:
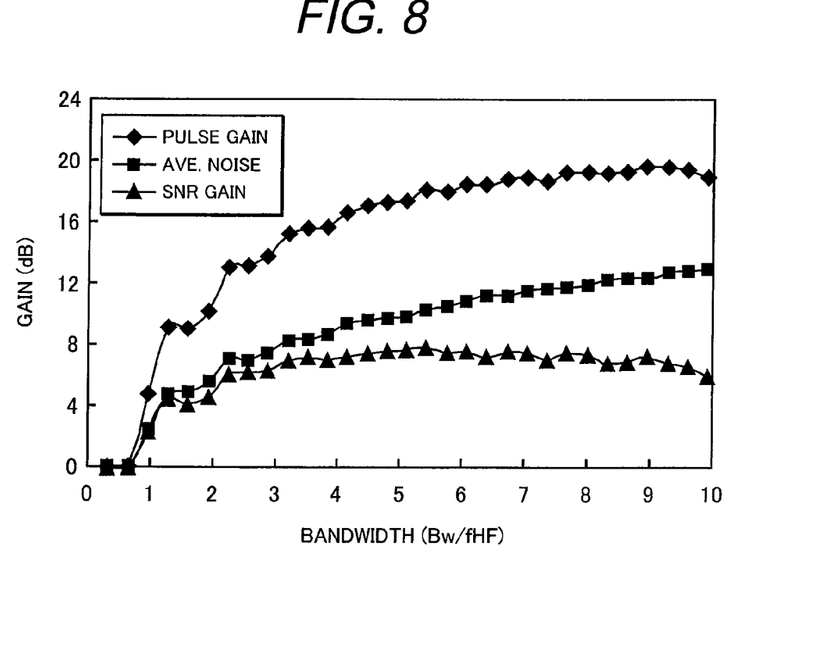
FIG. 8 is a diagram illustrating the result of simulation performed to indicate the effect of MTD.

If, in this instance, the percentage of increase in the signal amplitude due to MTD is higher than the percentage of increase in the noise amplitude, the SNR improves. However, Equations 1 and 2 do not imply that the SNR improves in a general situation. FIG. 8 shows a typical calculation result that indicates the dependence of signal amplitude and noise amplitude on input bandwidth. The calculation result is obtained on the assumption that a laser pulse is a rectangular wave and has a pulse duty of ⅛. It is also assumed that the band of an input signal is subjected to bandwidth limitation by a 12th-order Butterworth low-pass filter. In FIG. 8, the horizontal axis indicates an input bandwidth $B_W$ that is normalized by a modulation frequency $f_{HF}$, whereas the vertical axis indicates the relative values of signal amplitude, noise amplitude, and SNR with respect to those of a conventional read system.

As is obvious from FIG. 8, the signal amplitude drastically increases in a region where the input band is not greater than 4 ($B_w/f_{HF}$). In this region, therefore, the SNR improves with the band expansion. When the input band exceeds 4 ($B_w/f_{HF}$), the amplitude increases gradually and then becomes substantially saturated. The reason is that the energy of the pulsed read signal is concentrated on harmonics of relatively low orders. Meanwhile, noise generally increases monotonously in accordance with Equation 2. Therefore, the SNR gain, which denotes the degree of SNR improvement based on MTD, becomes saturated.

As is apparent from the above description, the MTD technology can improve the SNR to a higher degree than the conventional technology by using the harmonic component of a read signal. If it is assumed that the read performance is equal to that is provided by the conventional technology, the height of a read light pulse can be decreased by the amount of SNR improvement. If, referring to the example shown in FIG. 8, the input band for MTD is, for instance, 1.5 times that of a carrier frequency, the SNR gain is approximately 4 dB. Thus, the height of the read light pulse can be decreased by up to 4 dB. Therefore, it can be fully expected that the read light resistivity will improve.

To meet the operating conditions for the above-described MTD in a situation where the carrier frequency is 400 MHz, it is necessary that the bandwidth of the photodiode and amplifier be 600 MHz or higher. It represents a bandwidth that is three to four times the bandwidth of an amplifier used for existing optical discs. In general, an increase in the amplifier's operating band tends to increase the noise generated from the amplifier and will reduce the effect of MTD with high probability. As such being the case, an amplifier having a narrow band should be used wherever possible with the carrier frequency lowered. The use of this method is also effective, as mentioned earlier, in lowering the carrier frequency, thereby decreasing the frequency with which a pulse is radiated on a spot.

It can be considered that a read light pulse samples a pattern of marks and spaces on a recording film. Therefore, the minimum allowable carrier frequency is two times the frequency of the maximum frequency component contained in an obtained read signal in accordance with the sampling theorem. In other words, the minimum allowable carrier frequency depends on linear recording density and read speed. In the case of a BD format having a recording capacity of 25 GB per layer, a pattern corresponding to the maximum frequency in a read signal is a repetition of 2T marks and 2T spaces, which is ¼ a channel clock frequency. Therefore, the channel clock frequency is 16.5 MHz at 1× speed. Thus, the carrier frequency, which needs to be at least ½ the channel clock frequency, is 33 MHz or higher at 1× speed and 66 MHz or higher at 2× speed. Here, it should be noted that the minimum carrier frequency allowable in the above cases is ½ the frequency of a channel clock, that is, lower than the frequency of the channel clock. The conventional read system cannot decrease the carrier frequency to ½ the frequency of the channel clock because the read signal cannot be separated from the carrier's line-like spectrum.

When decreasing the carrier frequency, it is necessary to pay attention to the duty of a read light pulse as well. Although various types of noise are generated from a laser, the most serious one is returned light noise. As mentioned earlier, the returned light noise can be avoided by preventing returned light from falling on a semiconductor laser during laser oscillation. Therefore, when only the carrier frequency is taken into consideration, decreasing the carrier frequency poses no problem because it increases the time interval between laser pulses, that is, increases the period of time during which laser oscillation is stopped. However, if the carrier frequency is decreased while maintaining the prevailing pulse duty, the length of a laser pulse may increase depending on the pulse duty, thereby allowing returned light to fall on the semiconductor laser during its oscillation. This situation can be avoided by decreasing both the carrier frequency and the pulse duty.

Figure 9:
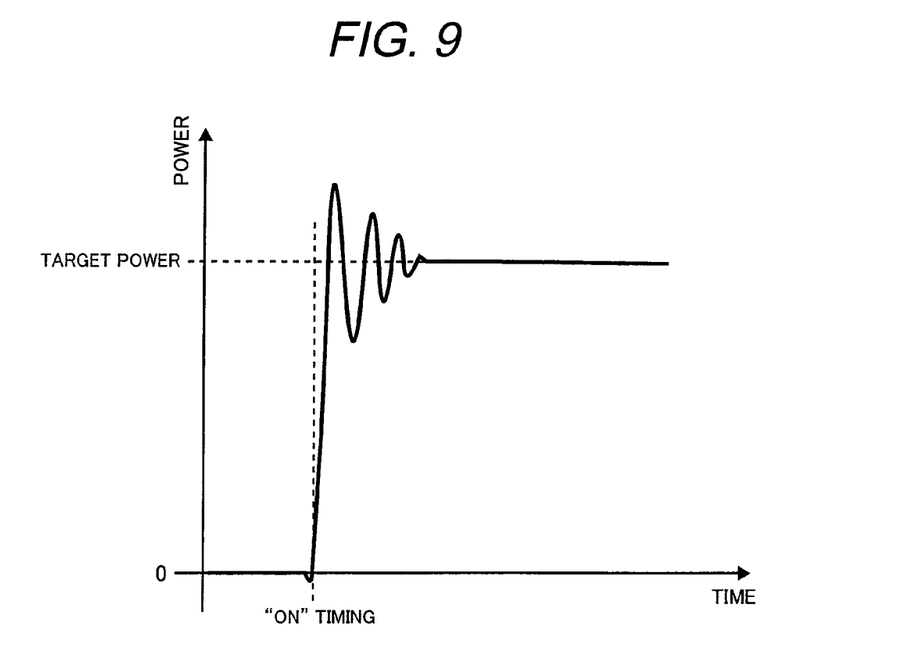
FIG. 9 is a schematic diagram illustrating the relaxation oscillation of a semiconductor laser.

One of the major factors for determining the read light resistivity is the peak power of a read light pulse. Therefore, when considering read light pulse conditions, it is necessary to pay attention to relaxation oscillation of the semiconductor laser as well. When the semiconductor laser switches from a stopped state to an oscillating state, relaxation oscillation occurs so that an intended waveform may experience an overshoot as shown in FIG. 9. This is also true for a read light pulse that is generated by using the high-frequency modulation technology. As the frequency of relaxation oscillation substantially corresponds to the maximum response speed of the semiconductor laser, the duration of the overshoot is short. However, the heating of a recording film by a laser pulse cannot be ignored because it invokes a substantially adiabatic temperature rise as energy is input within an extremely short period of time during which thermal diffusion is negligible.

The influence of such an output light waveform overshoot due to relaxation oscillation can be avoided by adjusting the drive waveform of the semiconductor laser. Relaxation oscillation is prominently observed when the semiconductor laser drastically switches from a non-oscillating state to an oscillating state. Therefore, it is possible to suppress relaxation oscillation or reduce its amplitude by emitting light first at a low power level and then at a peak power level.

The recording film of a rewritable optical disc is made of a phase change material. When the recording film, which is initially in a crystalline state, is molten with recording laser light and then rapidly cooled, it switches to an amorphous state and forms a recorded mark. Therefore, the physical edge of the recorded mark is a transition area in which a crystalline portion and amorphous portion are in contact with each other. Recorded information erasure by read light takes place when a recorded mark placed in the amorphous state is annealed by heating and gradual cooling and gradually crystallized. If, in such an instance, the amorphous portion is in contact with the crystalline portion, crystallization is likely to progress with the crystalline portion handled as a nucleus. Therefore, the aforementioned edge begins to deteriorate before the center of the mark.

The above problem can be avoided by preventing a read light pulse from being radiated on the edge of the recorded mark. The physical position of the mark edge substantially coincides with the edge position of a read signal. Therefore, the problem can be avoided by synchronizing the read light pulse with a clock based on a channel clock and adjusting the phase to prevent the read light pulse from hitting the edge.

The present invention makes it possible to provide an optical disc drive that can be more read light resistive than existing optical disc drives while maintaining read performance equal to or higher than that of the existing optical disc drives.

BRIEF DESCRIPTION OF THE DRAWINGS

Embodiments of the present invention will be described in detail based on the following figures, wherein.

DETAILED DESCRIPTION OF THE INVENTION

First Embodiment

Figure 1:
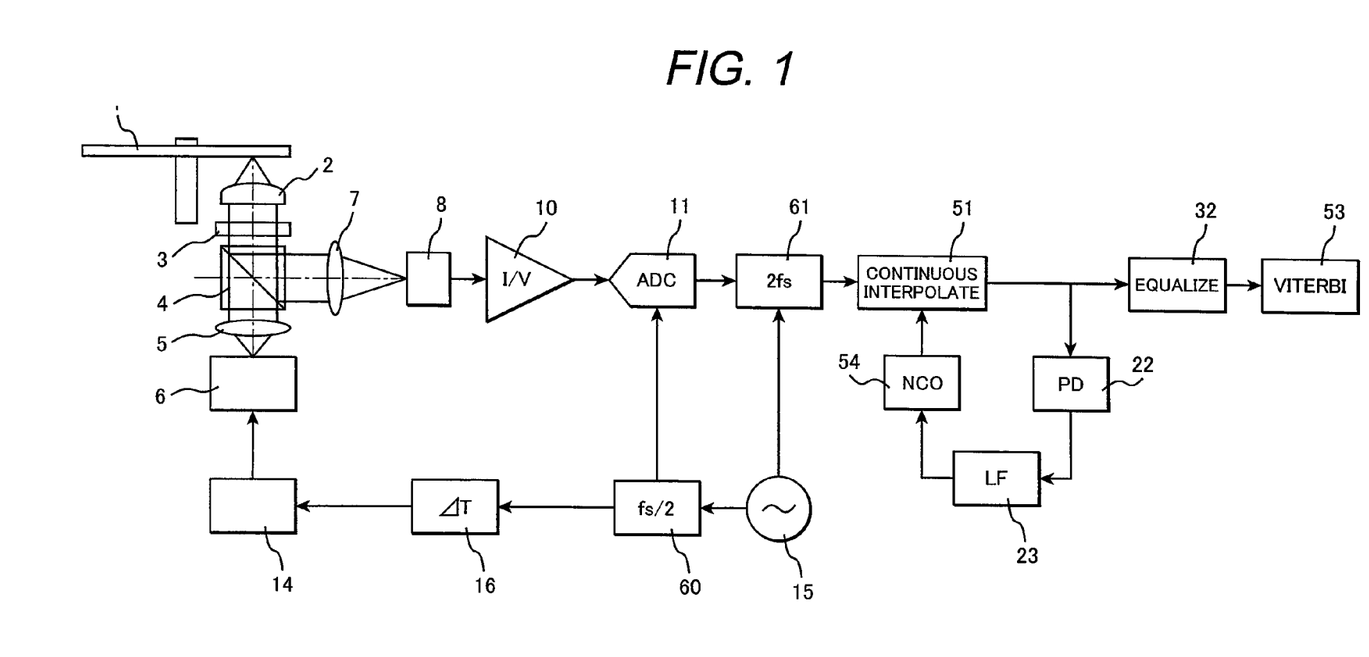
FIG. 1 is a diagram illustrating an optical disc drive according to an embodiment of the present invention.

FIG. 1 shows an example of an optical disc drive according to an embodiment of the present invention. It is assumed for explanation purposes that the optical disc drive uses a BD-formatted disc having a recording capacity of 25 GB per layer. An oscillator 15 generates a clock signal having a period of $\tau$. The value $\tau$ is close to a channel clock period T; however, $\tau \leq T$. The frequency of the clock signal is divided by half by a divider 60. The resultant clock signal then enters a laser driver 14 through a variable delay line 16. In other words, the frequency-divided clock signal is used as a carrier. The laser driver 14 synchronizes with an input oscillator output, generates a laser drive current pulse for acquiring desired average laser power, peak power, and duty, and inputs the generated laser drive current pulse into a laser diode 6. The laser driver 14 also controls a laser drive current so that the average laser output is constant.

Laser light is converted to a parallel beam by a collimator lens 5, passed through a polarizing beam splitter 4 and a quarter-wavelength plate 3, and focused on the surface of a recording film on a disc 1 by an objective lens 2. The laser light is reflected from the recording film surface so that a reflected pulsed laser train on which an intensity variation based on recorded marks and spaces are superimposed is obtained. When the reflected pulsed laser train returns to the polarizing beam splitter 4 through the currently used path, it is reflected, focused on a photodiode 8 by a converging lens 7, and converted to an electrical current. The electrical current is converted to a voltage signal, that is, a pulsed read signal, by a current amplifier 10. The pulsed read signal is then converted to a digital signal by an ADC 11. The ADC 11 is driven so as to sample the peak value of each pulse within the pulsed read signal (indicated by the broken line) as shown in FIG. 6.

The output of the divider 60, that is, the frequency-divided output of the oscillator 15, is used as a drive clock for the ADC 11. However, there is a phase difference between the oscillator output and pulsed read signal due to delay caused by the photodiode and a process performed before laser light emission. Therefore, the phase difference is adjusted by the variable delay line 16. The signal obtained by sampling the peak of each pulse in the pulsed read signal is hereinafter referred to as the sampled pulsed read signal. In the currently used example, the sampling speed of the sampled pulsed read signal is close to a channel clock frequency. Therefore, the sampled pulsed read signal corresponds, except for SNR, to a digital read signal that is obtained by subjecting a read signal to analog-to-digital conversion in the read system of a conventional optical disc drive.

Figure 10:
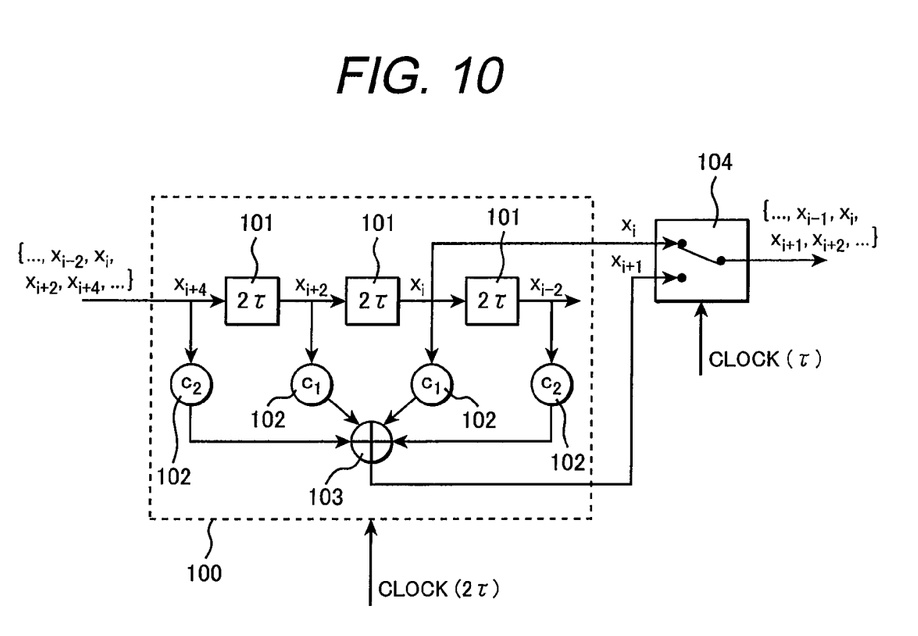
FIG. 10 shows a typical configuration of a sampling speed multiplier that doubles the sampling speed.

Sampling speed conversion is effected by a sampling speed multiplier 61 so that the sampled pulsed read signal having a sampling time interval or a sampling speed of $2\tau$ is converted to a signal having a time interval of $\tau$. FIG. 10 shows a typical configuration of the sampling speed multiplier 61. In the example shown in FIG. 10, the sampling speed multiplier 61 includes an FIR (finite impulse response) interpolator 100 and a duplexer 104. When an input signal sample taken at time i is xi, the input signal is expressed by the number sequence $\{ \ldots, x_{i-2}, x_i, x_{i+2}, x_{i+4}, \ldots \}$ because the input sampling interval of the sampling speed multiplier is $2\tau$. The FIR interpolator is a four-tap FIR filter as shown in FIG. 10, and includes three dual time delayers 101, four multiplicators 102, and an adder 103. The two central multiplicators multiply their input values by $9/16$, whereas the remaining two multiplicators multiply their input values by $-1/16$. As this type of interpolator is widely known, its details, such as the derivation of its coefficients, will not be described here. When the inputs to the multiplicators are $\{x_{i-2}, x_i, x_{i+2}, x_{i+4}\}$ as shown in FIG. 10, the outputs of the multiplicators are interpolated values at time i+1. As the operation cycle of the FIR interpolator is $2\tau$, the output of the adder and the output value of each dual time delayer are retained for a period of $2\tau$. When the duplexer 104 having an operation cycle of $\tau$ transmits these outputs alternately at a time interval of $\tau$ $\{ \ldots, x_{i-1}, x_i, x_{i+1}, x_{i+2}, \ldots \}$, a sampled pulsed read signal converted to the one prevailing at a sampling speed of $\tau$ is obtained.

The sampled pulsed read signal converted to the one prevailing at a sampling speed of $\tau$ by the sampling speed multiplier enters an interpolator 51. The interpolator converts the input sampled pulsed read signal to a signal that is obtained by resampling the input sampled pulsed read signal with the frequency and phase specified by a clock, which is another input. This type of interpolator is widely known and capable of changing the sampling speed of an input signal in sufficiently small steps. A concrete configuration example will not be described in detail here because it is disclosed, for instance, in "Interpolation in Digital Modems—Part I: Fundamentals," by Floyd M. Gardner, IEEE Transactions on Communications, Vol. 41, pp. 501-507 (1993) and in "Interpolation in Digital Modems—Part II: Implementation and Performance," by Lars Erup, IEEE Transactions on Communications, Vol. 41, pp. 998-1008 (1993). As the output signal of the interpolator and the channel clock are not synchronized yet, they are synchronized by using a PLL. More specifically, a phase detector 22 detects the phase difference between the interpolator output signal and channel clock, and then the obtained result is smoothed by a loop filter 23. A numerically-controlled oscillator 54 oscillates at a frequency based on the output of the loop filter. The operation of the loop filter will not be described in detail here because it is disclosed in detail in "Interpolation in Digital Modems—Part I: Fundamentals," by Floyd M. Gardner, IEEE Transactions on Communications, Vol. 41, pp. 501-507 (1993) and in "Interpolation in Digital Modems—Part II: Implementation and Performance," by Lars Erup, IEEE Transactions on Communications, Vol. 41, pp. 998-1008 (1993). The interpolator output signal is equalized by an adaptive equalizer 32, input into a Viterbi decoder 53, and decoded to obtain a bit stream. The output of the numerically-controlled oscillator, which is not shown in the figure, is used as a drive clock for the adaptive equalizer 32 and Viterbi decoder 53.

Figure 11:
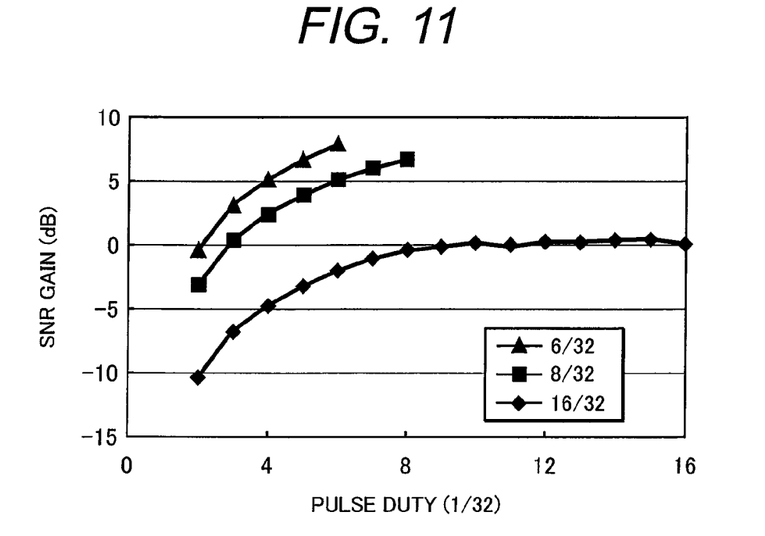
FIG. 11 shows an example of calculation results that indicate read light resistivity improved by MTD.

The present embodiment is characterized in that the carrier frequency is approximately ½ the channel clock frequency, that is, extremely low or equal to the lowest carrier frequency necessary for reading a BD-formatted disc having a recording capacity of 25 GB per side. Further, the pulsed read signal transmission bandwidth including the transmission bandwidths of a photodetector and a current amplifier is 2.5 times that of the channel clock frequency. In this instance, the superiority of a read light resistive system over the conventional read system varies with the pulse duty permitted by the conventional read system. Examples of calculations of the superiority of the read light resistive system over the conventional read system are shown in FIG. 11. FIG. 11 is prepared on the assumption that the minimum pulse duty and maximum average power permitted by the conventional read system are specified. In FIG. 11, the SNR gain prevailing when MTD is performed while the same read light pulse height is maintained as in the situation assumed above is plotted against the read light pulse duty. FIG. 11 shows the results of calculations performed on the cases where the minimum pulse duty permitted by the conventional system is $6/32$, $8/32$, and $16/32$. When the minimum pulse duty permitted by the conventional system is $6/32$, the SNR gain provided by MTD is 8.1 dB at a pulse duty of $6/32$. Therefore, the read light resistivity can be improved when MTD is performed without sacrificing the read performance so that the read light pulse height is lower than that of the conventional system by up to 8.1 dB. Recorded information erasure occurs depending on a recording film temperature rise caused by a read light pulse. When rough approximation is permitted, it can be assumed that the recording film temperature rise occurs adiabatically. It means that the power of the read light pulse can be decreased by 8.1 dB. Thus, the amount of temperature rise is estimated to be less than half the previous value. Consequently, it can be expected that the read light resistivity will significantly improve.

The read light resistivity can also be improved by decreasing the pulse duty of a read light pulse under the above-mentioned conditions to decrease the frequency of radiation. In a situation where, for instance, the minimum pulse duty permitted by the conventional system is $6/32$ as shown in FIG. 11, the SNR gain provided by MTD is approximately 0 dB when the pulse duty is decreased to $2/32$. Even when the pulse width is reduced to ⅓, substantially the same read performance can be achieved as when the conventional system is used. Thus, it is possible to provide three times the read light resistivity of the conventional system.

As is obvious from FIG. 11, the degree of read light resistivity improvement by MTD varies with the minimum pulse duty permitted by the conventional system. As far as MTD is performed in a situation where the minimum pulse duty permitted by the conventional system is $8/32$, the read light pulse height can be 6.81 dB lower than that of the conventional system. Further, when the pulse duty is decreased, it is possible to provide ⅔ times the read light resistivity of the conventional system. However, if the minimum pulse duty permitted by the conventional system is $16/32$, the read light resistivity cannot possibly be improved by MTD.

Figure 12:
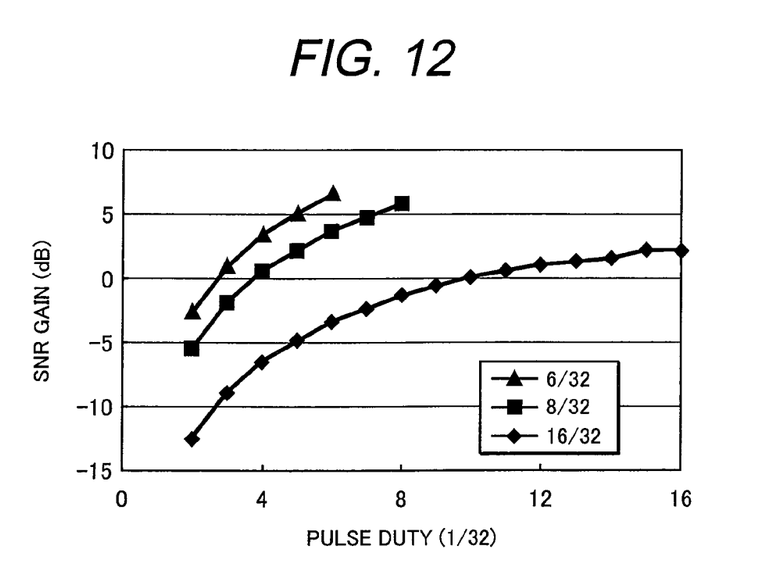
FIG. 12 shows another example of calculation results that indicate read light resistivity improved by MTD.

The degree of read light resistivity improvement by MTD also varies with the pulsed read signal transmission bandwidth including the transmission bandwidths of the photodetector and current amplifier. When the MTD technology is used, it is necessary that the transmission bandwidths of the photodetector and current amplifier be greater than those of the conventional system. However, when the cost and the noise characteristics of the amplifier are taken into consideration, an alternative is to minimize the degree of such a bandwidth increase. To produce a significant result by performing MTD, it is necessary to use a harmonic of at least the ±first order. When the bandwidth of a read signal is also taken into consideration, the pulsed read signal transmission bandwidth including the transmission bandwidths of the photodetector and current amplifier needs to be at least 1.5 times the channel clock frequency. FIG. 12 shows the results of calculations performed when the pulsed read signal transmission bandwidth including the transmission bandwidths of the photodetector and current amplifier is 1.5 times the channel clock frequency under the same conditions as indicated in FIG. 11.

More specifically, FIG. 12 shows the results of calculations performed on the cases where the minimum pulse duty permitted by the conventional system is $6/32$, $8/32$, and $16/32$. FIG. 12 indicates that the read light pulse height can be 6.7 dB lower than that of the conventional system when MTD is performed in a situation where the minimum pulse duty permitted by the conventional system is $6/32$. Further, when the pulse duty is decreased, it is possible to improve the read light resistivity by more than 2 times. When MTD is performed in a situation where the minimum pulse duty permitted by the conventional system is $8/32$, the read light pulse height can be 5.9 dB lower than that of the conventional system. Further, when the pulse duty is decreased, it is possible to improve the read light resistivity by less than 2 times. When MTD is performed in a situation where the minimum pulse duty permitted by the conventional system is $16/32$, the read light pulse height can be 2.3 dB lower than that of the conventional system. Further, when the pulse duty is decreased, it is possible to improve the read light resistivity by 1.6 times.

As mentioned earlier, setup should be performed so that the oscillation frequency of the oscillator 15 is slightly higher than the channel clock frequency. This makes it possible to minimize the transmission bandwidths of the photodetector, current amplifier, and the like, which are required for MTD.

It will be readily understood by those skilled in the art that the PLL for synchronizing the channel clock with the output signal of the interpolator in the embodiment described above may also be configured in various manners other than the one indicated in the example shown in FIG. 1. Further, it will be readily understood by those skilled in the art that multiple read speeds can be handled by making the transmission bandwidth of a pulsed read signal variable through the use of a programmable low-pass filter.

Moreover, when the linear recording density is increased in the BD format until the lengths of 2T marks and spaces (T=channel clock period), which are the shortest, are less than the optical resolution, the maximum frequency component in a read signal is a 2T-3T repetition pattern, which has a 5T period. In this case, therefore, the carrier frequency can be decreased to a minimum of ⅖ the channel clock frequency.

Second Embodiment

Figure 13:
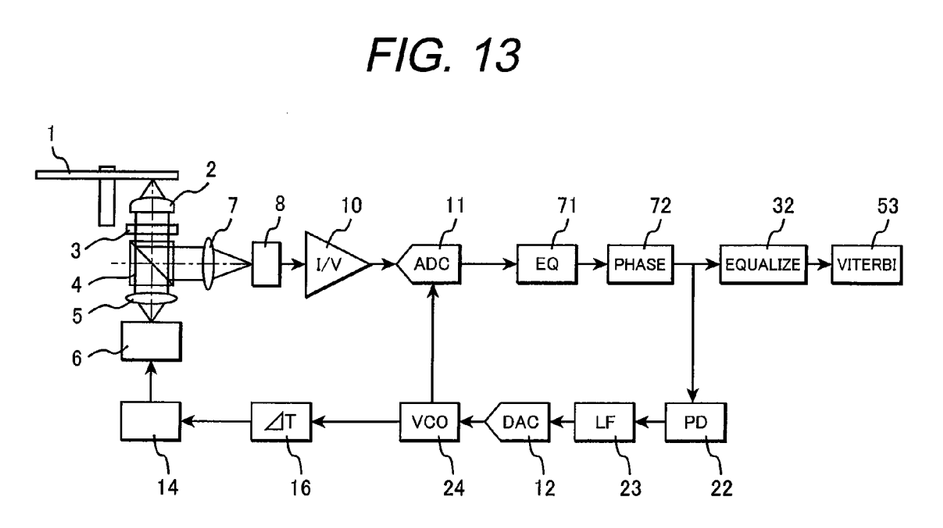
FIG. 13 shows a typical configuration of a drive that is capable of controlling the radiation position of a read light pulse.

FIG. 13 shows a second embodiment of the present invention. The second embodiment is characterized in that the position of read light pulse radiation on the recording film can be controlled. To provide such control, the present embodiment uses the voltage-controlled oscillator output of a channel PLL as a carrier to synchronize a read light pulse with a channel clock.

Referring to FIG. 13, it is assumed that the output clock of the voltage-controlled oscillator 24 is synchronized with the channel clock of a read signal. The output of the voltage-controlled oscillator enters the laser driver 14 through the variable delay line 16. The laser driver 14 synchronizes with an input voltage-controlled oscillator output, generates a laser drive current pulse for acquiring desired average laser power, peak power, and duty, and inputs the generated laser drive current pulse into the laser diode 6. The laser driver 14 also controls a laser drive current so that the average laser output is constant.

Laser light is converted to a parallel beam by the collimator lens 5, passed through the polarizing beam splitter 4 and the quarter-wavelength plate 3, and focused on the surface of the recording film on the disc 1 by the objective lens 2. The laser light is reflected from the recording film surface so that a reflected pulsed laser train on which an intensity variation based on recorded marks and spaces are superimposed is obtained. When the reflected pulsed laser train returns to the polarizing beam splitter 4 through the currently used path, it is reflected, focused on the photodiode 8 by the converging lens 7, and converted to an electrical current. The electrical current is converted to a voltage signal, that is, a pulsed read signal, by the current amplifier 10. The pulsed read signal is then converted to a digital signal by the ADC 11. The ADC 11 is driven so as to sample the peak value of each pulse within the pulsed read signal (indicated by the broken line) as shown in FIG. 6.

The output of the voltage-controlled oscillator 15 is used as a drive clock for the ADC 11. However, there is a phase difference between the oscillator output and pulsed read signal due to delay caused by the photodiode and a process performed before laser light emission. Therefore, the phase difference is adjusted by the variable delay line 16.

The output signal of the ADC 11 is equalized by a digital equalizer 71, forwarded to a phase shifter 72, and phase-shifted by a predetermined amount from the phase of the channel clock. Then, the phase detector 22 determines phase difference from the channel clock. The resultant phase difference signal is smoothed by the loop filter 23, and then converted to a voltage signal by the DAC 12. The obtained voltage signal is used as a control signal for the voltage-controlled oscillator. The output signal of the phase shifter is equalized by the adaptive equalizer 32, input into the Viterbi decoder 53, and decoded to obtain a bit stream.

Figure 14:
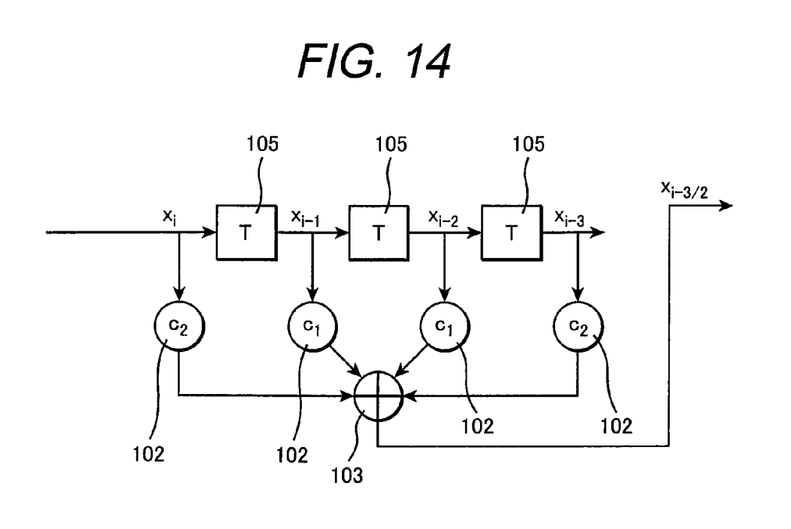
FIG. 14 shows a typical configuration of a phase shifter.

The phase shifter 72 is a four-tap FIR filter as shown in FIG. 14. When two central tap coefficients are $9/16$, whereas the remaining two tap coefficients are $-1/16$, the output of the FIR filter is an interpolated value between xi and xi+1, that is, xi+½. In other words, the output signal of the phase shifter is a waveform that is delayed by (½)T from the phase of its input signal. When attention is focused on the fact that the read light pulse radiation position is a sampling point of a mark-space pattern on the recording film, it is equivalent to the fact that the sampling timing is delayed by (½)T by the phase shifter shown in FIG. 14. Then, the value −(½)T is added to the output value of the phase detector 22 at all points. The PLL operates to adjust the output clock phase of the voltage-controlled oscillator so that the phase difference detected by the phase detector is 0. More specifically, the adjustment is made so that the phase of sampling the mark-space pattern on the recording film advances by (½)T. It will be readily understood by those skilled in the art that the phase can be adjusted as desired between −(½)T and (½)T by setting appropriate values in the multiplicators shown in FIG. 14.

Some rewritable optical discs are such that the erasure of recorded information significantly occurs at an edge of a recorded mark. The recording film of a rewritable optical disc uses a phase change material. When the recording film, which is initially in a crystalline state, is molten (fused) with recording laser light and then rapidly cooled, it switches to an amorphous state and forms a recorded mark. Therefore, the physical edge of the recorded mark is a transition area in which a crystalline portion and amorphous portion are in contact with each other. Recorded information erasure by read light takes place when a recorded mark placed in the amorphous state is annealed by heating and gradual cooling and gradually crystallized. If, in such an instance, the amorphous portion is in contact with the crystalline portion, crystallization is likely to progress with the crystalline portion handled as a nucleus. Therefore, the edge begins to deteriorate before the center of the mark.

The above problem can be avoided by preventing a read light pulse from being radiated on the edge of the recorded mark. The physical position of the mark edge substantially coincides with the edge position of a read signal. Therefore, the problem can be avoided by synchronizing the read light pulse with a clock based on the channel clock and adjusting the phase to prevent the read light pulse from hitting the edge. In other words, the problem can be avoided when the phase shifter adjusts the phase in such a manner as to meet the above conditions during the use of the configuration shown in FIG. 13.

When the same phase shifter setting is constantly used during the use of the configuration shown in FIG. 13, the read light pulse is constantly radiated without changing its phase. Therefore, recorded information erasure progresses from a spot on which the radiation is concentrated. If the employed disc is such that recorded information erasure is not likely to occur on a particular portion of a recorded mark, the problem of recorded information erasure may actually become evident. This problem does not occur during the use of a conventional optic disc drive or the configuration shown in FIG. 1 because the position of read light pulse radiation is determined at random. This problem can be effectively avoided, for instance, by changing, after each seek, the phase adjustment amount to be set in the phase shifter.

Further, in the example case shown in FIG. 1, it is necessary to set the oscillation frequency of the oscillator 15 in accordance with the channel clock frequency. Therefore, when a read is to be performed in a CAV (constant angular velocity) mode in which the channel clock frequency continuously varies, it is necessary to set the oscillation frequency of the oscillator in accordance with the radial position of the disc to be read. In the example case shown in FIG. 13, however, it is not necessary to go to the trouble of performing such oscillation frequency setup because the carrier frequency automatically follows the channel clock frequency.

In a common configuration, a digital equalizer is used to deliver adequate phase comparison performance in the PLL as shown in FIG. 13. In this instance, the digital equalizer is generally configured as an FIR type. Therefore, the digital equalizer and phase shifter can be integrated into a single FIR filter by setting appropriate tap coefficients.

Figure 15:
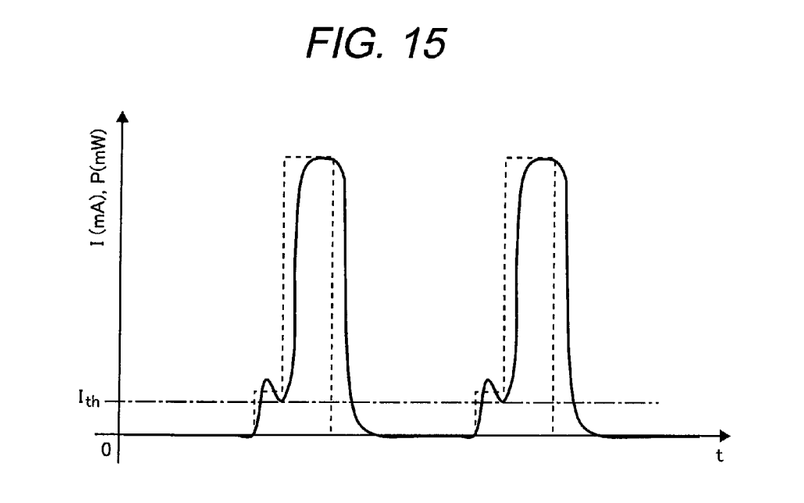
FIG. 15 is a schematic diagram illustrating a typical drive pulse that suppresses the relaxation oscillation of a semiconductor laser.

As mentioned earlier, one of the major factors for determining the read light resistivity is the peak power of a read light pulse. Therefore, an intended waveform may experience an overshoot due to relaxation oscillation that occurs when the semiconductor laser switches from a stopped state to an oscillating state as shown in FIG. 9. This phenomenon also occurs in a situation where a read light pulse is generated by using the high-frequency modulation technology. The influence of such an output light waveform overshoot due to relaxation oscillation can be avoided by adjusting the drive waveform of the semiconductor laser. Relaxation oscillation is prominently observed when the semiconductor laser drastically switches from a non-oscillating state to an oscillating state. Therefore, relaxation oscillation at a pulse peak is suppressed by emitting light first at a low power level and then at a peak power level as shown in FIG. 15. The vertical axis of FIG. 15 represents both the drive current and optical output power of the semiconductor laser. In FIG. 15, the broken line indicates the drive current, whereas the thick solid line indicates the optical output power. The value Ith, which is indicated by the one-dot chain line, is the threshold current of the semiconductor laser, that is, an electrical current value at which laser oscillation begins. The drive current is first increased to a level slightly above a threshold value. In this instance, relaxation oscillation occurs; however, the read light resistivity remains unaffected because the absolute value of light emission power is small. The drive current is then increased until a desired peak output is obtained. In this instance, relaxation oscillation is not likely to occur because the laser is already in an oscillating state.

Third Embodiment

Figure 16:
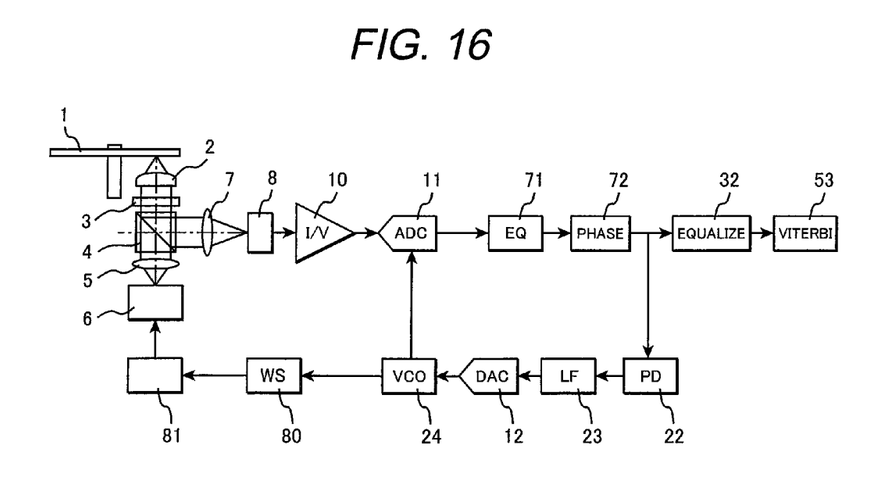
FIG. 16 shows a typical configuration that is formed when a simple laser driver is used.

A third embodiment of the present invention will now be described with reference to FIG. 16. The configuration shown in FIG. 16 is similar to the configuration shown in FIG. 13 except that a simple laser driver 81 having no built-in write strategy is used as the laser driver. The simple laser driver is merely capable of converting an input pulse waveform to a pulse current signal for driving the laser with desired power and incapable of adjusting the pulse duty. When the simple laser driver is used, a write waveform is generated by a dedicated circuit and forwarded to the simple laser driver. In the example case shown in FIG. 16, a write waveform generation circuit 80 is used as a pulse signal source for a read light pulse. The pulse duty of the read light pulse is determined by the write waveform generation circuit 80. The output of the voltage-controlled oscillator 24 in a read PLL is used as a pulse clock for generating the read light pulse in the write waveform generation circuit 80.

It should be understood by those skilled in the art that various modifications, combinations, sub-combinations, and alterations may occur depending on design requirements and other factors insofar as they are within the scope of the appended claims or the equivalents thereof.

The present invention is applicable to all types of optical disc drives.

What is claimed is:

1. An optical disc drive comprising:
a laser light source;
a light source drive that pulse-drives the laser light source;
an optical system that irradiates an optical disc with laser light emitted from the laser light source;
a section that converts optical information to an electrical pulsed read signal, the optical information being optically read from the optical disc when the optical disc is irradiated with the laser light;
a section that converts the pulsed read signal to a sampled pulsed read signal;
a section that synchronizes the pulse drive signal of the laser light source with a channel clock;
a section that changes the phase of the sampled pulsed read signal relative to a channel clock signal;
a section that decodes the sampled pulsed read signal to obtain data recorded on the optical disc; and
wherein a pulse drive frequency of the laser light source is not higher than a channel clock frequency and is at least two times the frequency of a maximum frequency component in the information optically read from the optical disc.

2. The optical disc drive according to claim 1, wherein the pulse drive frequency of the laser light source is at least ½ the channel clock frequency.

3. The optical disc drive according to claim 1, wherein the pulse drive frequency of the laser light source is at least ⅖ the channel clock frequency.

4. The optical disc drive according to claim 1, wherein the section that changes the phase adjusts the phase so that a laser pulse is not incident on a recorded mark edge.

5. The optical disc drive according to claim 1, wherein the optical disc drive is configured to cause the pulse duty of the pulsed read signal to be no higher than ½.

6. The optical disc drive according to claim 1, wherein the optical disc drive is configured to cause the pulse drive to be performed so that power lower than the peak power of the pulse is radiated before the pulse is radiated.

7. An optical disc drive comprising:
a laser light source;
a light source drive that pulse-drives the laser light source;
an optical system that irradiates an optical disc with laser light emitted from the laser light source;
a section that converts optical information to an electrical pulsed read signal, the optical information being optically read from the optical disc when the optical disc is irradiated with the laser light;
a section that converts the pulsed read signal to a sampled pulsed read signal;
a section that decodes the sampled pulsed read signal to obtain data recorded on the optical disc;
a section that synchronizes the pulse drive signal of the laser light source with a channel clock; and
a section that changes the phase of the sampled pulsed read signal relative to a channel clock signal.

8. An optical disc drive comprising:
a laser light source;
a light source drive that pulse-drives the laser light source;
an optical system that irradiates an optical disc with laser light emitted from the laser light source;
an analog-to-digital converter that generates a sampled pulsed read signal from a pulsed read signal reflected from the optical disc;
a sampling speed multiplier that converts the sampled pulsed read signal to a predefined sampling speed;
an interpolator that changes the sampling speed of the sampled pulsed read signal converted by the sampling speed multiplier; and
a section that decodes an output signal of the interpolator to obtain a bit stream.

* * * * *